(12) United States Patent
Sargent, III et al.

(10) Patent No.: US 7,698,638 B2
(45) Date of Patent: Apr. 13, 2010

(54) SYSTEMS AND METHODS FOR AUTOMATED EQUATION BUILDUP

(75) Inventors: Murray Sargent, III, Medina, WA (US); Jennifer P. Michelstein, Kirkland, WA (US); Ethan Joseph Bernstein, Seattle, WA (US); Said Abou-Hallawa, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1094 days.

(21) Appl. No.: 10/943,095

(22) Filed: Sep. 15, 2004

(65) Prior Publication Data

US 2006/0059214 A1 Mar. 16, 2006

(51) Int. Cl.
G06F 17/00 (2006.01)
G06F 17/20 (2006.01)
(52) U.S. Cl. .................................. 715/267; 715/273
(58) Field of Classification Search ............... 715/267, 715/264
See application file for complete search history.

(56) References Cited

U.S. PATENT DOCUMENTS

| | | | | |
|---|---|---|---|---|
| 5,067,102 A | * | 11/1991 | Eisenstein | 708/142 |
| 5,189,633 A | | 2/1993 | Bonadio | |
| 5,251,292 A | | 10/1993 | Martel | |
| 5,432,721 A | | 7/1995 | Satoh | |
| 5,469,538 A | | 11/1995 | Razdow | |
| 5,627,914 A | * | 5/1997 | Pagallo | 382/189 |
| 5,682,158 A | | 10/1997 | Edberg et al. | |
| 5,784,071 A | | 7/1998 | Tang et al. | |
| 5,793,381 A | | 8/1998 | Edberg et al. | |
| 5,844,555 A | | 12/1998 | Menaker et al. | |
| 5,901,074 A | | 5/1999 | Nakano et al. | |
| 6,204,782 B1 | | 3/2001 | Gonzalez et al. | |
| 6,549,923 B1 | | 4/2003 | Sudoh | |
| 6,610,106 B1 | * | 8/2003 | Jenks | 715/205 |
| 6,795,838 B1 | | 9/2004 | Kataoka | |
| 6,829,620 B2 | | 12/2004 | Hsing et al. | |
| 6,925,597 B2 | | 8/2005 | Anwar | |
| 6,934,910 B2 | | 8/2005 | Lange | |
| 6,999,082 B2 | | 2/2006 | Nishimura | |
| 7,120,867 B2 | | 10/2006 | Breuer et al. | |
| 7,188,115 B2 | | 3/2007 | Farn et al. | |
| 7,324,931 B1 | * | 1/2008 | Warlock | 703/13 |
| 2001/0007109 A1 | | 7/2001 | Lange | |
| 2003/0056181 A1 | | 3/2003 | Marathe | |
| 2004/0114258 A1 | | 6/2004 | Harris, III et al. | |

(Continued)

OTHER PUBLICATIONS

Gear, C.W., "Numerical solution of ordinary differential eqautions at a remote terminal", ACM, 1966, pp. 43-49.*

(Continued)

Primary Examiner—Laurie Ries
Assistant Examiner—James J Debrow
(74) Attorney, Agent, or Firm—Merchant & Gould P.C.

(57) ABSTRACT

Systems and methods for automatically building up an equation entered into a computer system can include an input module that accepts input of the equation in a linear string format, and an interpret module that interprets the input and automatically determines when a buildup point is reached. Systems can further include a formatting module that, upon reaching the buildup point, automatically formats at least a portion of the equation into a two-dimensional format. A display module can display the portion of the equation in the two-dimensional format. A revision module allows the equation to be edited.

14 Claims, 4 Drawing Sheets

U.S. PATENT DOCUMENTS

| | | | |
|---|---|---|---|
| 2004/0117731 | A1 | 6/2004 | Blyashov |
| 2004/0157203 | A1* | 8/2004 | Dunk et al. ............... 434/350 |
| 2004/0205583 | A1 | 10/2004 | Jones et al. |
| 2004/0210818 | A1 | 10/2004 | Jones et al. |
| 2004/0215647 | A1* | 10/2004 | Farn et al. ............... 707/101 |
| 2005/0041017 | A1 | 2/2005 | de Brebisson |
| 2006/0005115 | A1* | 1/2006 | Ritter et al. ............... 715/503 |
| 2006/0059214 | A1 | 3/2006 | Sargent et al. |
| 2006/0059217 | A1 | 3/2006 | Sargent et al. |
| 2006/0190474 | A1 | 8/2006 | Michelstein et al. |
| 2006/0190821 | A1 | 8/2006 | Michelstein et al. |
| 2006/0256116 | A1 | 11/2006 | Burago et al. |
| 2006/0274070 | A1 | 12/2006 | Herman et al. |
| 2007/0011515 | A1 | 1/2007 | Heydarian et al. |
| 2007/0033524 | A1 | 2/2007 | Michelstein et al. |
| 2008/0077854 | A1 | 3/2008 | Alabi |

OTHER PUBLICATIONS

Anthony et al., "Evaluation of Multimodal Input for Entering Mathimatical Equations on the Computer", 2005, ACM, pp. 1184-1187.*

Bruhn et al., "MathML and SVG", 2004, ACM, pp. 97-106.*

Zhao et al., math Information Retrieval: User Requirments and Prototype Implementation, ACM, 2008.*

Oetiker, T. et al., "The Not So Short Introduction to Latex 2ε," Version 4.14, 145 pages (Copyright 1995-2002).

"PS Technical Word Processor," *Scroll Systems, Inc.*, Front page, Copyright page, Contents (iii-xii), Chapter 13 (13-1-13-20) (Copyright 1985, 1986, 1987).

"MathType Mathematical Equation Editor User Manual," 144 pages (Copyright 1987-2001).

"Mathematics on the Web," *MacKichan Software, Inc.*, 19 pages (Dec. 2001).

"Natural Mathematical Notation," http://www.scientificword.com/nmn.html, *MacKichan Software, Inc.*, 2 pages (Copyright 1998).

Sargent III, M., "Unicode Nearly Plain-Text Encoding of Mathematics," *Microsoft Corporation*, 16 pages (Jul. 2, 2004).

Sargent III, M. "Unicode, Rich Text, and Mathematics," *Microsoft Corporation*, 19 pages (Aug. 30, 1995).

ScienceWord Manual, mk:@MSITStore:C:\temp\Temporary%20Directory%201%20for%20SW31Manual.zip\S..., Chapter One, Chapter Four (Sections 1-3, 5-10), 27 pages (Date last printed Sep. 29, 2004).

"Character Encoding," pp. 1-4 (2002).

DuCharme, B., Math and XSLT—from XML.com, pp. 1-6 (Jul. 5, 2001).

Mathematical Markup Language (MathML) Version 2.0 (Second Edition); W3C Recommendation Oct. 21, 2003, Copyright © 1998-2003 W3C® (MIT, ERCIM, Keio), pp. 1-541.

Microsoft, "Word 2000 Screenshots," pp. 1-6 (Dec. 31, 1999).

LyX, "News," retrieved from Internet Mar. 11, 2008, 28 pages, p. 11 includes "New Maintenance Release: LyX 1.3.4 Released" dated Feb. 19, 2004.

LyX Team, "The LyX User's Guide," Feb. 2004, pp. 1-76.

Beeton et al., "Unicode Support for Mathematics," Copyright 2001-2003, pp. 1-45.

Unicode, Inc., "C0 Controls and Basic Latin," Copyright 1991-2005, pp. 420-425.

Connolly, "HTML 3.0 Draft (Expired!) Materials," Dec. 21, 1995, 1 page.

W3, "HTML Math," Published 1995, 4 pages.

Ion et al., "Mathematical Markup Language (MathML) Frequently Asked Questions (FAQ)," Copyright 1998, 7 pages.

Jones, "Using the Equation Editor," Aug. 10, 2003, 9 pages.

Phillips, "Special Edition Using XML," Aug. 25, 2000, Copyright page (pp. 1-2), Chapter 24 Section 2, (pp. 3-18), Chapter 24 Section 10 (pp. 19-26).

Unicode, Inc., "Mathematical Alphanumeric Symbols," Copyright 1991-2005, pp. 969-995.

InfoLogic, Inc., "MathMagic Personal Edition & MathMagic Pro Edition User Guide," Dec. 2003, 100 pages.

Smithies et al., "A Handwriting-Based Equation Editor," Jun. 1999, 8 pages.

U.S. Official Action in U.S. Appl. No. 11/196,801 mailed Apr. 1, 2009.

U.S. Office Action cited in U.S. Appl. No. 11/067,378 mailed Apr. 30, 2007.

U.S. Final Office Action cited in U.S. Appl. No. 11/067,378 mailed Nov. 16, 2007.

U.S. Office Action cited in U.S. Appl. No. 11/067,378 mailed May 14, 2008.

U.S. Final Office Action cited in U.S. Appl. No. 11/067,378 mailed Feb. 4, 2009.

U.S. Office Action cited in U.S. Appl. No. 11/067,540 mailed May 1, 2007.

U.S. Final Office Action cited in U.S. Appl. No. 11/067,540 mailed Nov. 14, 2007.

U.S. Office Action cited in U.S. Appl. No. 11/067,540 mailed Aug. 6, 2008.

U.S. Final Office Action cited in U.S. Appl. No. 11/067,540 mailed Feb. 23, 2009.

U.S. Office Action cited in U.S. Appl. No. 11/196,801 mailed Sep. 18, 2008.

U.S. Office Action cited in U.S. Appl. No. 11/229,023 mailed Feb. 20, 2008.

U.S. Final Office Action cited in U.S. Appl. No. 11/229,023 mailed Sep. 11, 2008.

U.S. Office Action cited in U.S. Appl. No. 11/229,023 mailed May 12, 2009.

Chinese First Office Action, Application No. 200510088518.6, mailed Jan. 23, 2009, 11 pages.

Chinese Second Office Action, Application No. 200510088518.6, mailed Jul. 3, 2009, 11 pages.

U.S. Office Action cited In U.S. Appl. No. 11/229,023 mailed Jan. 11, 2010.

* cited by examiner

SYSTEMS AND METHODS FOR AUTOMATED EQUATION BUILDUP

TECHNICAL FIELD

The present invention relates to systems and methods for the interpretation and buildup of equations entered into a computer system.

BACKGROUND

The ability to efficiently input mathematical equations into word processing applications and html editors is becoming increasingly important as more technical information is distributed in word-processed and web page formats. Programs such as TeX and LaTeX allow a user to typeset and print mathematical equations in a format that is portable across different computing environments. However, such programs are complicated and require the user to have special knowledge of how the programs work before the user can input, typeset, and print equations.

Word processor programs are typically bundled with an editor that allows a user to create and edit equations within the word-processing environment. One example of such an editor is Microsoft® Equation Editor 3.0, which is distributed by Microsoft Corporation of Redmond, Wash. These types of equation editors are typically WYSIWYG editors that require users to select among various toolbar icons to develop two-dimensional equations. However, the selection of toolbar icons can be cumbersome for experienced users who frequently enter complicated and lengthy equations.

It is therefore desirable to provide systems and methods that allow for ease in entry of equations while displaying such equations in a two-dimensional format.

SUMMARY

The present invention relates to systems and methods for the interpretation and buildup of equations entered into a computer system.

One aspect of the invention relates to a computing system for automatically building up an equation. The system can include an input module that accepts input of the equation in a linear string format, and an interpret module that interprets the input and automatically determines when a buildup point is reached. The system can also include a formatting module that, upon reaching the buildup point, automatically formats at least a portion of the equation into a two-dimensional format.

Another aspect of the invention relates to a method for automatically building up an equation entered into a computer system. The method can include: accepting input of the equation in a linear string format, automatically determining if a buildup point has been reached, and automatically converting at least a portion of the equation from the linear string format to a two-dimensional format upon reaching the buildup point.

Yet another aspect of the invention relates to a method for automatically building up an equation entered into a computer system. The method can include: accepting input of a first character of the equation in a linear string format; examining the first character to determine if a first buildup point has been reached; if the first buildup point has been reached: converting automatically a first portion of the equation from the linear string format to a two-dimensional format; displaying the first portion of the equation in the two-dimensional format; and thereafter, continuing to accept input of a second character of the equation in the linear string format; if the first buildup point has not been reached, accepting input of the second character of the equation in the linear string format.

BRIEF DESCRIPTION OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention relates to systems and methods for the interpretation and buildup of equations entered into a computer system.

As used herein, the phrase "linear string format" refers to a linear text-based representation of an equation using a linear notation such as, for example, TeX or LaTeX. An example of an equation in linear string format is "x=½" ("x is equal to one-half").

The phrase "two-dimensional format" refers to a format in which an equation is represented using a non-linear notation such as, for example, Polish prefix format. Polish prefix format is a format including, for example, a function start character followed by a numerator, a separator character, a denominator, and an end-function delimiter. An example of an equation in two-dimensional format is $$x = \frac{1}{2}$$

("x is equal to one-half").

An equation can be converted from linear string format to two-dimensional format and vice versa. For example, embodiments disclosed herein including systems and methods for automatically converting portions of equations from linear string format to two-dimensional format.

Figure 1:
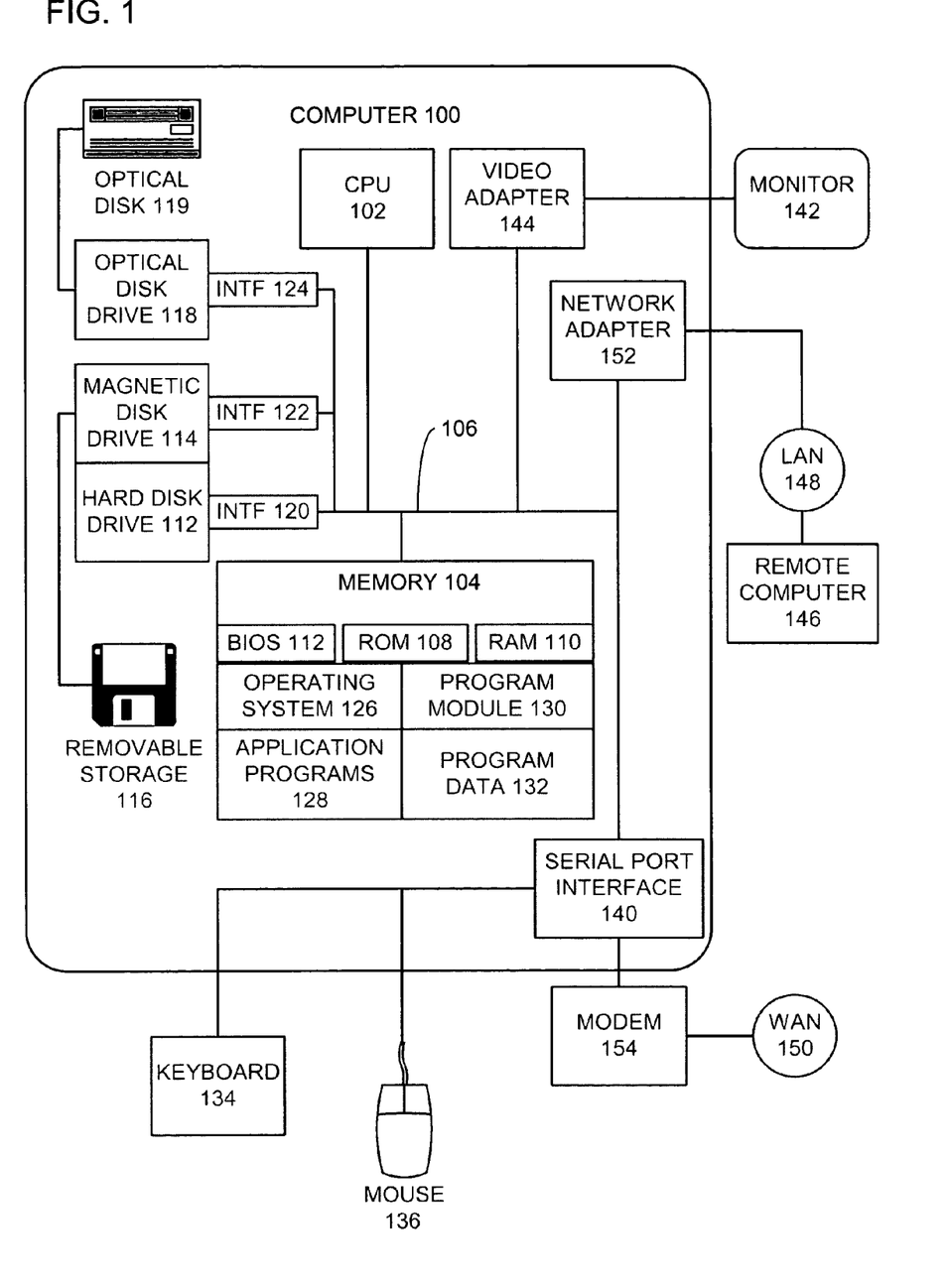
FIG. 1 illustrates an example general purpose computing system according to one embodiment of the present invention.

Referring now to FIG. 1, an example computer system 100 is illustrated. The computer system 100 illustrated in FIG. 1 can take a variety of forms such as, for example, a desktop computer, a laptop computer, and a hand-held computer. In addition, although computer system 100 is illustrated, the systems and methods disclosed herein can be implemented in various alternative computer systems as well.

The system 100 includes a processor unit 102, a system memory 104, and a system bus 106 that couples various system components including the system memory 104 to the processor unit 102. The system bus 106 can be any of several types of bus structures including a memory bus, a peripheral bus and a local bus using any of a variety of bus architectures. The system memory includes read only memory (ROM) 108 and random access memory (RAM) 110. A basic input/output system 112 (BIOS), which contains basic routines that help transfer information between elements within the computer system 100, is stored in ROM 108.

The computer system 100 further includes a hard disk drive 112 for reading from and writing to a hard disk, a magnetic disk drive 114 for reading from or writing to a removable magnetic disk 116, and an optical disk drive 118 for reading from or writing to a removable optical disk 119 such as a CD ROM, DVD, or other optical media. The hard disk drive 112, magnetic disk drive 114, and optical disk drive 118 are connected to the system bus 106 by a hard disk drive interface 120, a magnetic disk drive interface 122, and an optical drive interface 124, respectively. The drives and their associated computer-readable media provide nonvolatile storage of computer readable instructions, data structures, programs, and other data for the computer system 100.

Although the example environment described herein can employ a hard disk 112, a removable magnetic disk 116, and a removable optical disk 119, other types of computer-readable media capable of storing data can be used in the example system 100. Examples of these other types of computer-readable mediums that can be used in the example operating environment include magnetic cassettes, flash memory cards, digital video disks, Bernoulli cartridges, random access memories (RAMs), and read only memories (ROMs).

A number of program modules can be stored on the hard disk 112, magnetic disk 116, optical disk 119, ROM 108, or RAM 110, including an operating system 126, one or more application programs 128, other program modules 130, and program data 132.

A user may enter commands and information into the computer system 100 through input devices such as, for example, a keyboard 134, mouse 136, or other pointing device. Examples of other input devices include a toolbar, menu, touch screen, microphone, joystick, game pad, pen, satellite dish, and scanner. These and other input devices are often connected to the processing unit 102 through a serial port interface 140 that is coupled to the system bus 106. Nevertheless, these input devices also may be connected by other interfaces, such as a parallel port, game port, or a universal serial bus (USB). An LCD display 142 or other type of display device is also connected to the system bus 106 via an interface, such as a video adapter 144. In addition to the display 142, computer systems can typically include other peripheral output devices (not shown), such as speakers and printers.

The computer system 100 may operate in a networked environment using logical connections to one or more remote computers, such as a remote computer 146. The remote computer 146 may be a computer system, a server, a router, a network PC, a peer device or other common network node, and typically includes many or all of the elements described above relative to the computer system 100. The network connections include a local area network (LAN) 148 and a wide area network (WAN) 150. Such networking environments are commonplace in offices, enterprise-wide computer networks, intranets, and the Internet.

When used in a LAN networking environment, the computer system 100 is connected to the local network 148 through a network interface or adapter 152. When used in a WAN networking environment, the computer system 100 typically includes a modem 154 or other means for establishing communications over the wide area network 150, such as the Internet. The modem 154, which can be internal or external, is connected to the system bus 106 via the serial port interface 140. In a networked environment, program modules depicted relative to the computer system 100, or portions thereof, may be stored in the remote memory storage device. It will be appreciated that the network connections shown are examples and other means of establishing a communications link between the computers may be used.

The embodiments described herein can be implemented as logical operations in a computing system. The logical operations can be implemented (1) as a sequence of computer implemented steps or program modules running on a computer system and (2) as interconnected logic or hardware modules running within the computing system. This implementation is a matter of choice dependent on the performance requirements of the specific computing system. Accordingly, the logical operations making up the embodiments described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Figure 2:
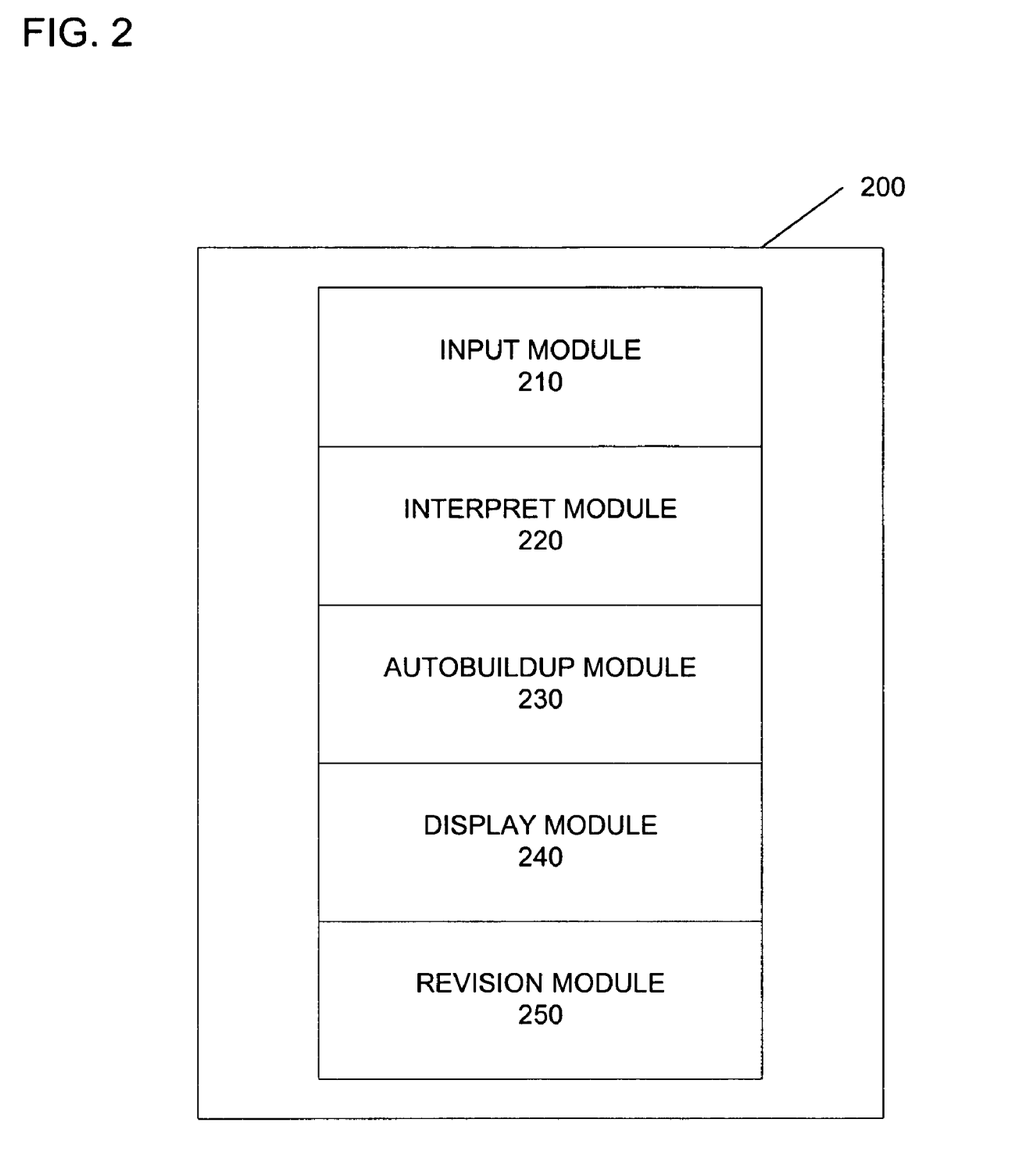
FIG. 2 illustrates an example system for automatically building up a portion of an equation according to one embodiment of the present invention.

Referring now to FIG. 2, an example system 200 for automatically building up a portion of an equation is shown. System 200 includes an input module 210, an interpret module 220, an autobuildup module 230, a display module 240, and a revision module 250. System 200 can be, for example, an application running on computer system 100 described above.

The input module 210 allows a user to input an equation into system 200. For example, the user can input an equation using input devices such as keyboard 134 and/or mouse 136 described above. In one embodiment, the input module 210 allows the user to input the equation using a linear string format notation. Examples of linear string format notations include TeX and LaTeX. Other linear string format notations can also be used.

For example, in one embodiment, input module 210 accepts input of an equation using a Linear Format notation similar to that incorporated into the application PS Technical Word Processor offered by Scroll Systems, Inc. and described in M. Sargent III, "Unicode Nearly Plain-Text Encoding of Mathematics," 26th Internationalization & Unicode Conference, San Jose, Calif. (September 2004). Linear Format notation is similar to that of TeX and LaTeX, but is a simplified notation that is similar to that interpreted by computer language compilers.

For example, input module 210 can accept input of the following Equation A in linear string format:

$$y=a/(b+c)+d \qquad \text{(A)}$$

Once the user begins to enter the equation in linear string format, interpret module 220 interprets the input to identify when a portion of the equation can automatically be built up into two-dimensional format.

Buildup generally occurs when the user enters a character that forces the text preceding the character to be an unambiguous linearly formatted text for a built-up expression as defined by an active linear format grammar (e.g., TeX, LaTeX, Linear Format). The decision regarding whether a portion of an equation can be built up is based on an analysis of the most recently entered character and its precedence relative to the operand preceding the character. Generally, each character is checked to determine what buildup can occur in view of the character. For example, if a user types an operand and then types a character that is separate from the operand, autobuildup may occur if the precedence of the character is less than or equal to that of the preceding character. For example, operators such as the plus "+" symbol can cause autobuildup if a preceding operator is a division "/" symbol.

The following examples illustrate how interpret module 220 can be configured to identify when buildup of a portion of an equation can occur. Linear Format is used for the examples. However, other linear string format grammars (e.g., TeX, LaTeX) can also be used in a similar manner.

To identify a buildup point, the interpret module 220 examines each character typed by the user. A precedence-oriented technique is used to determine when autobuildup is to occur. For example, in one embodiment, operators in the Linear Format grammar have the precedences given in the following Table 1.

TABLE 1

Operator Precedence

| Operator | Precedence |
| --- | --- |
| Carriage Return | 0 |
| "(" or "[" or "{" or "<" | 1 |
| ")" or "]" or "}" or ">" | 2 |
| Vertical Tab | 3 |
| Other Unicode math operators (i.e., those not listed in other precedence levels in Table 1) | 4 |
| Fractions ("/" and atop) | 5 |
| √ or ∛ or ∜ or operator indicating enclosure of operand in a rectangle or operator indicating conversion of operand to an array | 6 |
| Unicode integrals, summation, product, and other nary ops | 7 |
| Subscript or superscript | 8 |
| Diacritics or factorials | 9 |

The operator precedence provided in Table 1 is illustrative, and changes to the precedence can be made.

When examining an input to determine whether or not to trigger autobuildup, the interpret module 220 first checks for conversions to/from math italic. If the character typed is an ASCII or Greek alphabetic with a math italic counterpart, then the character is translated to the math italic version. If the character is subscript "_", superscript "^", or space, and the preceding character is a math italic and still more characters precede that character in the equation, then a span of math italics is compared to a dictionary of function names. If found, the name is translated back to ordinary text (e.g., "sin" is translated back to "sin").

If no such translation is made, interpret module 220 starts at the beginning of the current argument if the insertion point (IP) is inside a built-up function, or the start of the entire equation or carriage return preceding the IP, whichever is closest to the IP.

Next, the choice for possible autobuildup is narrowed by advancing to the first major buildup operator, (i.e., an operator other than one of ")" or "]" or "}" or ">"). If such an operator is found before getting back to the IP, then the range is expanded backward to include the numerator for a fraction or the scriptbase for a subscript "_" or superscript "^" symbol. Then buildup is attempted on the text in this range.

Specifically, interpret module 220 scans this range, pushing simple operands onto a rich-text string stack and operators onto an operator stack. Autobuildup of an expression is triggered when the operator immediately following the expression is a ")" or "]" or "}" or ">", or when the operator is not a "(" or "[" or "{" or "<" and one of the following conditions is true: (i) precedence of the operator is less than that of the previous operator; or (ii) precedences of the operator and the previous operator both equal 4, 5, or 7.

In some embodiments, if a change is made inside an argument of a builtup function (i.e., the IP is within a portion of an equation that has already been builtup), analysis by interpret module 220 for determining when to trigger autobuildup can be restricted the argument that is being edited. This restriction can simplify the analysis performed by the interpret module 220 and thereby increase processing efficiency. In other embodiments, the interpret module 220 can be configured to analyze the entire equation regardless of whether a builtup argument is edited.

In one example illustrative of autobuildup, interpret module 220 interprets Equation A above and identifies when a portion of Equation A can be built up. For Equation A, the interpret module 220 would trigger autobuildup upon entry by the user of a space after the left parenthesis ")" during input of Equation A. This portion of Equation A is illustrated as Equation A' below:

$$y=a/(b+c) \tag{A'}$$

The following pseudocode illustrates one example of how interpret module 220 can interpret input by the user of portion Equation A' of Equation A to identify when autobuildup can be triggered.

| Input by User to Input Module | Action(s) by Interpret Module |
| --- | --- |
| a | "a" goes into backing store |
|  | Translate "a" to math italic "*a*" |
|  | Attempt to trigger automatic buildup, but fail |
| / | "/" goes into backing store |
|  | Attempt to trigger automatic buildup, but fail |
| ( | "(" goes into backing store |
|  | Attempt to trigger automatic buildup, but fail |
| b | "b" goes into backing store |
|  | Translate "b" to math italic "*b*" |
|  | Attempt to trigger automatic buildup, but fail |
| + | "+" goes into backing store |
|  | Attempt to trigger automatic buildup, but fail |
| c | "c" goes into backing store |
|  | Translate "c" to math italic "*c*" |
|  | Attempt to trigger automatic buildup, but fail |
| ) | ")" goes into backing store |
|  | Attempt to trigger automatic buildup, but fail |
| Space | Trigger automatic buildup successfully |

As illustrated in the pseudocode provided above, autobuildup is not always successful upon the interpret module 220 identifying one of the predetermined characters that signifies an autobuildup point. For example, for Equation A', interpret module 220 does not trigger autobuildup upon entry of the plus symbol "+" because at that point in the entry of Equation A no portion of the equation can be built up into two-dimensional format because there is no previous operator having a greater precedence. In addition, interpret module 220 does not trigger autobuildup upon entry of the left parenthesis "(" because additional information may be entered that would be needed before buildup of a portion of Equation A can occur. However, upon entry of the space after the left parenthesis ")", interpret module 220 can trigger autobuildup of portion Equation A' of Equation A because the character immediately following the space is one of ")" or "]" or "}" or ">" (see precedence value 2 in Table 1 above).

As noted in the above pseudocode, each entered character is placed in a backing store. The backing store is a persistent storage space from which typed data can be stored and retrieved. In addition, as illustrated by the above pseudocode, the interpret module 220 can also perform some aspects of formatting of the equation such as, for example, conversion of variables into math italic format.

Once the interpret module 220 triggers autobuildup, autobuildup module 230 attempts to convert at least a portion of the equation into two-dimensional format. For example, when interpret module 220 triggers autobuildup for portion Equation A' of Equation A, autobuildup module 230 converts portion Equation A' of Equation A into two-dimensional format as illustrated by Equation B' below.

$$y = \frac{a}{b+c} \qquad (B')$$

The following pseudocode illustrates one example embodiment of how autobuildup module 230 can build Equation B' from Equation A'.

Push math italic "a" onto (rich-text) string stack
  Push "/" onto operator stack
  Push "(" onto operator stack
  Push math italic "b" onto string stack
  Push "+" onto operator stack
  Push math italic "c" onto string stack
  ")" causes "b+c" to be concatenated on string stack
  "Space" causes parenthesis "(" and ")" to be removed and fraction to be built up In one embodiment, autobuildup module 230 performs buildup using a precedence-sensitive expression analysis similar to that used by computer language compilers. In addition, autobuildup module 230 can further format the equation as desired. For example, as illustrated by Equation B', autobuildup module 230 formats the equation by removing the parenthesis "(" and ")" and the space after the left parenthesis ")" upon autobuildup.

Display module 240 displays the portion of the equation that has been built up in two-dimensional format for the user using a display device such as LCD display 142 described above. The display device 240 also displays any portion of the equation that has been entered but not yet built up in linear string format.

After automatic buildup of a portion of an equation, the input module 210 continues to allow input of the equation in linear string format, and the interpret module 220 continues to interpret the input. For example, for Equation A, once Equation A' has automatically been built up, the user can continue to enter the remaining portion of Equation A. Since no further buildup is necessary for the remaining portion of Equation A ("+d"), the display module 240 displays the entire Equation A in two-dimensional format after the remaining portion of Equation A has been inputted into system 100 as Equation B below.

$$y = \frac{a}{b+c} + d \qquad (B)$$

The revision module 250 allows the user to edit the equation. The user can edit the equation while the equation is in linear string format or in two-dimensional format. As the user edits the equation, the interpret module 220 continues to monitor the input to determine if additional portions of the equation can be automatically built up into two-dimensional format.

Another example illustrative of autobuildup is provided by Equation C shown in two-dimensional format below.

$$y = \frac{a}{b^2 + c^2} \qquad (C)$$

As input from the user of Equation C in linear string format is accepted by input module 210, interpret module 220 examines each character to determine when to trigger autobuildup. As the user enters the plus "+" sign in the denominator of Equation C (i.e., when the user has entered "y=a/(b^2+"), the interpret module 220 triggers buildup of a portion of Equation C by autobuildup module 230, illustrated as Equation C' below.

$$y=a/(b^2+ \qquad (C')$$

Specifically, the superscript for variable "b" is builtup because the precedence value of the plus "+" sign is less than that of the superscript "^" sign. See Table 1 above. However, the entire denominator is not yet built up because the denominator has not yet been unambiguously defined.

Next, when the user has entered the right parenthesis ")" (i.e., the user has entered "y=a/(b²+c^2"), the superscript for variable "c" is built up as shown in Equation C" below.

$$y=a/(b^2+c^2 \qquad (C'')$$

Finally, when the user enters a space or carriage return after the right parenthesis ")", the denominator of Equation C is builtup as shown as Equation C above.

Figure 3:
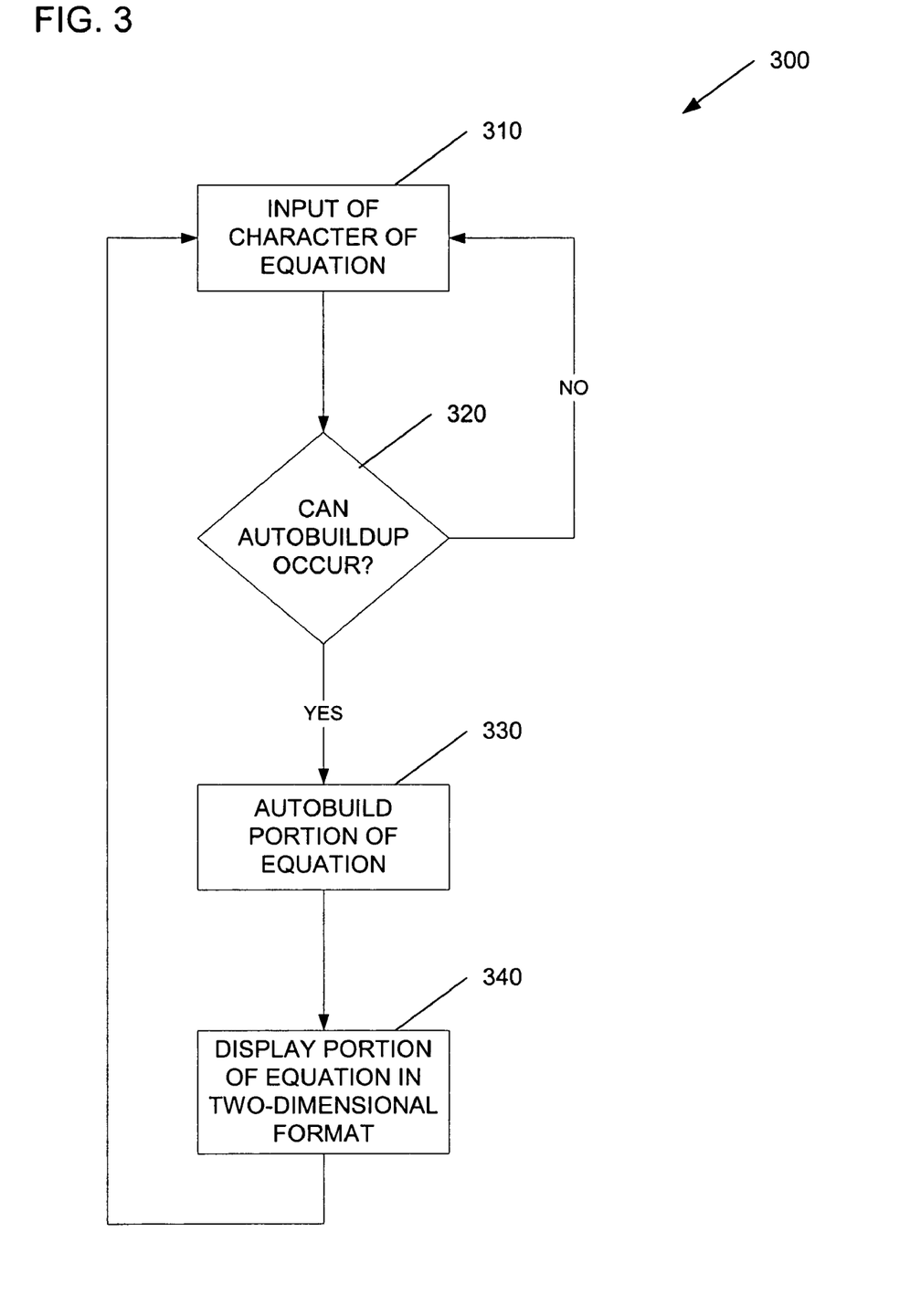
FIG. 3 illustrates an example method for automatically building up a portion of an equation according to one embodiment of the present invention.

Referring now to FIG. 3, an example method 300 is shown for automatically building up an equation as a user inputs the equation into a computer system. At operation 310, the user is allowed to begin input of the equation in linear string format. As each character of the equation is entered, control is passed to operation 320, where a determination is made as to whether or not autobuildup can occur on a portion of the equation that has been entered using, for example, the precedence buildup logic described above. If autobuildup can occur, control is passed to operation 330. Otherwise, if autobuildup cannot occur, control is passed back to operation 310 and input of the equation continues.

At operation 330, a portion of the equation is built up in two-dimensional format. Next, in operation 340, the built-up portion of the equation is displayed in the two-dimensional format. Finally, control is passed back to operation 310 and input of the equation in linear string format continues.

Figure 4:
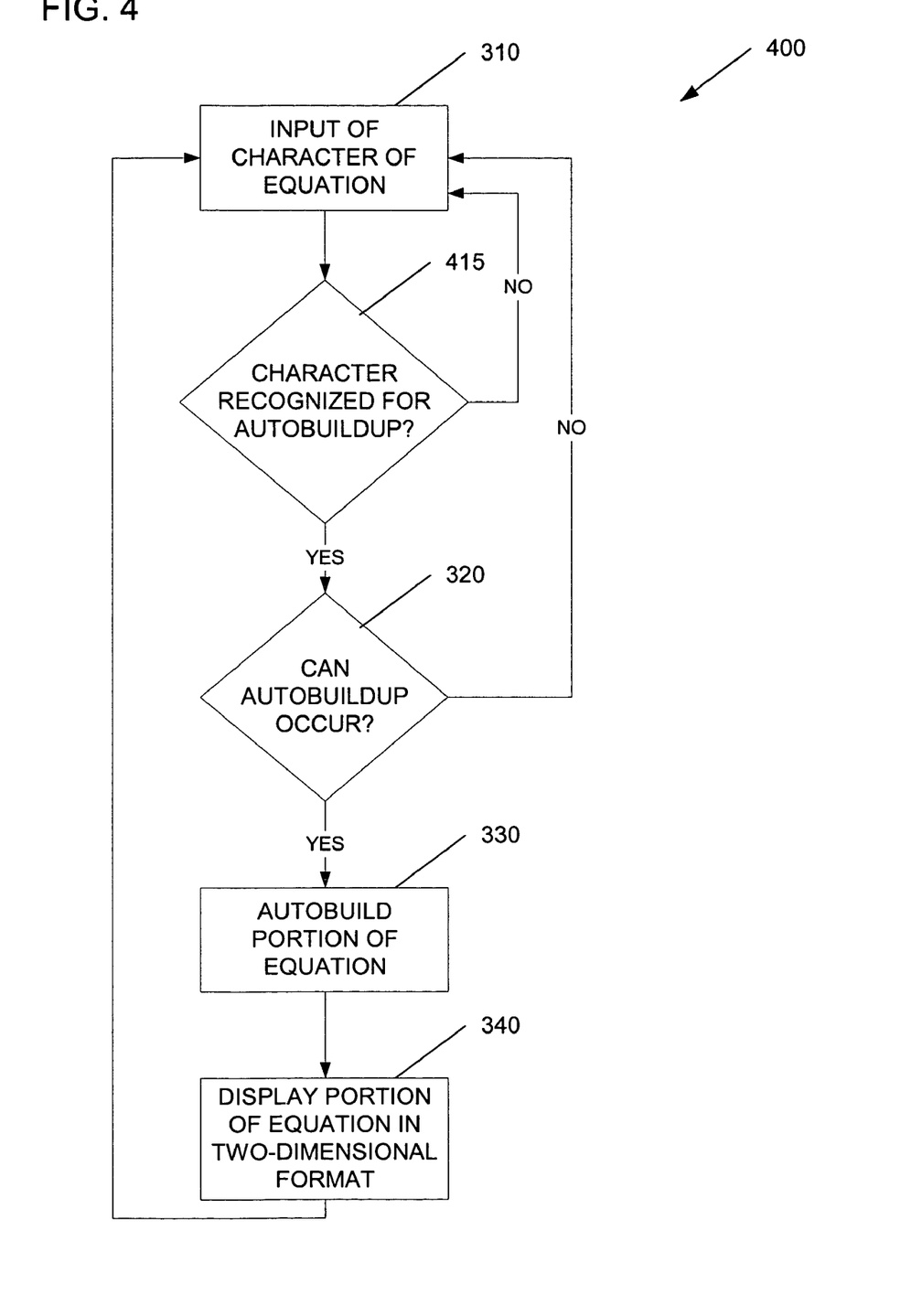
FIG. 4 illustrates another example method for automatically building up a portion of an equation according to one embodiment of the present invention.

Referring now to FIG. 4, another example method 400 is shown for automatically building up an equation. Method 400 is similar to method 300 and includes operations 310, 320, 330, and 340. However, method 400 also includes operation 415 positioned between entry operation 310 and buildup determination operation 320. Operation 415 examines the input to look for predetermined characters that signal that buildup can occur. Examples of such characters include: right parenthesis ")", binary operators, any punctuation, tab, enter, and space. If any of these characters are entered, operation 415 passes control to operation 320 to allow for a determination as to whether or not autobuildup can occur. If the character that has been entered is not one of the noted characters, operation 415 passed control back to operation 310 and input of the equation in linear string format continues without a determination as to whether or not a portion of the equation can be built up.

For example, buildup cannot occur after the subscript character "_" is entered because it is necessary for the user to enter the substance of the subscript before buildup of the subscript portion of the equation can be accomplished. Therefore, when control is passed to operation 415 after the subscript character has been entered in operation 310, operation 415 simply passes control back to operation 310 to wait for entry of the next character of the equation rather than passing control to operation 320 for a determination as to whether or not buildup can occur. In this manner, the entry and interpretation of an equation can be optimized because autobuildup determinations occur only when predetermined characters are entered.

In some embodiments, the systems and methods disclosed herein are further enhanced by allowing portions of commonly-used equations to be automatically entered and built up. For example, the application Microsoft® Word, which is distributed by Microsoft Corporation of Redmond, Wash., includes an "AutoCorrect" feature that allows a user to automatically expand frequently-used text strings by entering a few identifying characters. A user can use these features to expand commonly-used portions of equations based on a few keystrokes by the user. The systems and methods disclosed herein can be used to automatically analyze the string that is expanded by the "AutoCorrect" feature and automatically buildup the string, if possible. In this manner, commonly-used portions of equations can be quickly entered and built up.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A computing system for automatically building up a mathematical equation, comprising:
   a processor; and
   a memory that stores computer readable instructions including:
     an input module that accepts input of the mathematical equation in a linear string format, the mathematical equation input including a sequence of characters including a most recently entered character and at least two non-alphanumeric operators;
     an interpret module that interprets the mathematical equation input and automatically determines when a buildup point is reached by:
       if the most recently entered character is one of the at least two non-alphanumeric operators, comparing precedence values of the two most recently entered non-alphanumeric operators, wherein buildup occurs if the precedence value of the most recently entered character is less than or equal to the precedence value of the non-alphanumeric operator immediately preceding the most recently entered character according to an order of increasing precedence as follows: a carriage return; one of a left parenthesis, a left bracket, and a less than operator; one of a right parenthesis, a right bracket, and a greater than operator; a vertical tab; a root operator; a nary operator; one of a subscript and a superscript; and one of a diacritic and a factorial; and
     a formatting module that, upon reaching the buildup point, automatically formats at least a portion of the mathematical equation into a two-dimensional format.

2. The system of claim 1, further comprising a revision module that allows the portion of the equation that is in two-dimensional format to be edited.

3. The system of claim 1, further comprising a revision module that allows the equation to be edited.

4. The system of claim 1, wherein entry of the equation causes the interpret module to trigger multiple buildup points.

5. The system of claim 1, further comprising a display module that displays the equation.

6. A method for automatically building up a mathematical equation entered into a computer system, the method comprising:
   accepting input of the mathematical equation in a linear string format, the mathematical equation input including a sequence of characters, including a most recently entered character, and at least two non-alphanumeric operators;
   automatically determining if a buildup point is reached by:
     if the most recently entered character is one of the at least two non-alphanumeric operators, comparing precedence values of the two most recently entered non-alphanumeric operators, wherein buildup occurs if the precedence value of the most recently entered character is less than or equal to the precedence value of the non-alphanumeric operator immediately preceding the most recently entered character according to an order of increasing precedence as follows: a carriage return; one of a left parenthesis, a left bracket, and a less than operator; one of a right parenthesis, a right bracket, and a greater than operator; a vertical tab; a root operator; a nary operator; one of a subscript and a superscript; and
     one of a diacritic and a factorial; and
   automatically converting at least a portion of the mathematical equation from the linear string format to a two-dimensional format upon reaching the buildup point.

7. The method of claim 6, further comprising editing the portion of the equation that is in the two-dimensional format.

8. The method of claim 6, further comprising editing the equation.

9. The method of claim 6, further comprising:
   accepting additional input of the equation in the linear string format;
   automatically determining of a second buildup point has been reached; and
   converting automatically at least a second portion of the equation from the linear string format to the two-dimensional format upon reaching the second buildup point.

10. The method of claim 6, further comprising displaying the equation.

11. A computer program product readable by a computer and encoding instructions on a computer-readable storage medium for executing the method recited in claim 6.

12. A method for automatically building up a portion of a mathematical equation entered into a computer device, the method comprising:

accepting input of a first most recently entered character in a sequence of characters, the sequence of characters including at least two non-alphanumeric operators of the mathematical equation in a linear string format;

examining the first most recently entered character to determine if a first buildup point has been reached by:

if the first most recently entered character is a non-alphanumeric operator of the at least two non-alphanumeric operators, comparing precedence values of the two most recently entered non-alphanumeric operators, wherein the first buildup occurs if the precedence value of the first most recently entered character is less than or equal to the precedence value of the non-alphanumeric operator immediately preceding the first most recently entered character according to an order of increasing precedence as follows: a carriage return; one of a left parenthesis, a left bracket, and a less than operator; one of a right parenthesis, a right bracket, and a greater than operator; a vertical tab; a root operator; a nary operator; one of a subscript and a superscript; and one of a diacritic and a factorial;

if the first buildup point has not been reached, accepting input of additional characters into the sequence of characters of the mathematical equation in the linear string format until the first buildup point is reached;

if the first buildup point has been reached:

automatically converting a first portion of the mathematical equation from the linear string format to a two-dimensional format;

displaying the first portion of the mathematical equation in the two-dimensional format; and thereafter, accepting input of a second most recently entered character in the sequence of characters of the mathematical equation in the linear string format;

examining the second most recently entered character to determine if a second buildup point has been reached by:

if the second most recently entered character is a non-alphanumeric operator of the at least two non-alphanumeric operators, comparing precedence values of the two most recently entered non-alphanumeric operators, wherein the second buildup point has been reached if the precedence value of the second most recently entered character is less than or equal to the precedence value of the non-alphanumeric operator immediately preceding the second most recently entered character according to the order of increasing precedence as follows: a carriage return; one of a left parenthesis, a left bracket, and a less than operator; one of a right parenthesis, a right bracket, and a greater than operator; a vertical tab; a root operator; a nary operator; one of a subscript and a superscript; and one of a diacritic and a factorial;

if the second buildup point has not been reached, accepting input of additional characters into the sequence of characters of the mathematical equation in the linear string format until the second buildup point is reached;

if the second buildup point has been reached:

automatically converting second portion of the mathematical equation from the linear string format to the two-dimensional format;

displaying the second portion of the mathematical equation in the two-dimensional format; and thereafter, accepting input of a third most recently entered character into the sequence of characters of the mathematical equation in the linear string format.

13. The method of claim 12, further comprising editing the first portion of the equation that is in the two-dimensional format.

14. A computer program product readable by a computer and encoding instructions on a computer-readable storage medium for executing the method recited in claim 12.

* * * * *